United States Patent
Liao et al.

(10) Patent No.: US 7,839,667 B2
(45) Date of Patent: Nov. 23, 2010

(54) ADAPTIVE LEADING-EDGE BLANKING CIRCUIT AND METHOD FOR SWITCHING MODE POWER CONVERTER

(75) Inventors: Chia-Wei Liao, San Jose, CA (US);
Jing-Meng Liu, Hsinchu County (TW);
Jwin-Yen Guo, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 393 days.

(21) Appl. No.: 12/071,727

(22) Filed: Feb. 26, 2008

(65) Prior Publication Data

US 2008/0211471 A1 Sep. 4, 2008

(30) Foreign Application Priority Data

Mar. 2, 2007 (TW) ............................. 96107199 A

(51) Int. Cl.
*H02M 3/24* (2006.01)
(52) U.S. Cl. ........................................ 363/97; 323/271

(58) Field of Classification Search .............. 363/21.04, 363/21.05, 16–20, 21.01, 56.09; 323/282–288, 323/259, 271, 275; 327/77, 379–381, 538, 327/543
See application file for complete search history.

(56) References Cited

U.S. PATENT DOCUMENTS

| | | | | |
|---|---|---|---|---|
| 5,414,341 A | * | 5/1995 | Brown | 323/268 |
| 6,219,262 B1 | * | 4/2001 | Burgyan | 363/97 |

* cited by examiner

*Primary Examiner*—Rajnikant B Patel
(74) *Attorney, Agent, or Firm*—Rosenberg, Klein & Lee

(57) ABSTRACT

In an adaptive leading-edge blanking circuit and method for a switching mode power converter, an inductor current of the converter is sensed and compared with a threshold to decide an end point of a leading-edge blanking time. Circuit and method are further provided for preventing the converter from entering pulse skipping mode, which employs a current trimming circuit in an oscillator for a PWM controller in the converter to reduce a charging current in the oscillator if the output voltage of the converter is excessively high, to thereby reduce the oscillator frequency and in turn lower the switching frequency of a high-side power switch of the converter.

24 Claims, 5 Drawing Sheets

US 7,839,667 B2

ADAPTIVE LEADING-EDGE BLANKING CIRCUIT AND METHOD FOR SWITCHING MODE POWER CONVERTER

FIELD OF THE INVENTION

The present is related generally to a power converter and, more particularly, to an adaptive leading-edge blanking (LEB) circuit and method for a switching mode power converter.

BACKGROUND OF THE INVENTION

Switching mode power converters contribute to provide regulated voltages with relatively compact size and superior efficiency thereof. A switching mode power converter with direct-coupled topology, such as boost converter and buck converter, has its power output terminal directly coupled with the power input terminal through a power switch. Otherwise, a switching mode power converter with transformer-coupled topology, such as flyback converter and forward converter, has its power output terminal isolated from the power input terminal by a transformer, and the power switch is arranged at the primary side of the transformer. Pulse-width modulation (PWM) is a method employed by switching mode power converters to regulate their output voltages, by which the difference between the output voltage and a reference value is sensed to decide the duty cycle of the power switch in a switching mode power converter. A PWM power converter employs a PWM controller to provide a PWM signal with a constant frequency for a power stage, and the power stage includes a pair of high-side and low-side power switches alternately turned on by the PWM signal. The PWM controller also receives a feedback signal from the power stage in order to modulate the on-time of the high-side and low-side power switches, so as to convert an input voltage to an output voltage for supplying for a load.

There is some difficulty with using peak current mode control accurately, especially at light current levels. As a power switch turns on, circuit parasitics in the power stage, output rectifier reverse recovery characteristics and high current gate drive pulses can create significant noise pulses on the leading edge of the current sense signal. When the high-side power switch is on and the low-side power switch is off, the power input supplies a current to charge the output capacitor to thereby generate the output voltage. However, since the feedback signal received by the PWM controller is actually a current sense signal derived from the power stage, at the moment a huge current surges into the power stage, oscillation may happen at the leading edge of the current sense signal, resulting in leading-edge noise that adversely affects the stability of the system. Traditionally, this problem is solved by adding a small RC filter or a predetermined blanking pulse to filter or blank the leading edge noise from entering the feedback input of the PWM controller. The power converter is typically equipped with a LEB circuit, and a constant LEB time is defined in the system design, by which the current sense signal is disconnected when a clock is started till the LEB time is up, whereby the current sense signal is blocked from entering the PWM controller during the LEB time. Referring to FIG. 1, the LEB time represented by a dotted line is begun from the valley of the oscillator signal Ct, and introduces a LEB pulse window to blank the leading edge of the current sense signal so that the PWM controller will practice the feedback control according to the blanked current sense signal. At low operating frequency and high output current level, these techniques generally offer satisfactory results. However, at higher switching frequency, and almost always at lighter load, these techniques cannot deliver high power efficiency, even satisfactory line/load regulation.

The predetermined blanking pulse is set by a threshold and the RC constant which could vary due to process and temperature variations. As stated previously, this blanking period along with pulses generated by the oscillator, constitute the on-time of a PWM controller. While the beginning of the blanking period has no problems, the end of it is not. The end point of a blanking period might take a large portion of the PWM on-time, resulting in an on-time that is longer than desired. This will in turn pump up the output voltage, leading to bad line regulation. The output of the error amplifier would be lowered by the increase of the output voltage and the system would eventually enter the pulse skipping mode, which generally introduces large ripples as well as unwanted harmonics. Typically, as shown in FIG. 1, the valley of the oscillator signal Ct is the start point of the LEB time, and the end point has to be decided otherwise. For a power converter operating with low frequency, the end point of the LEB time is typically decided by the circuit designer during it is designed. Under consideration of the effects resulted from process variation and temperature drift, a circuit designer usually prefers to give a postponed end point for the LEB time so as to fully blank the leading-edge noise. This approach achieves good outcomes at low operating frequency and heavy load. However, with the operating frequency of the power converter higher and higher, a much longer LEB time is not only disadvantageous to high power efficiency but also adverse to good output/input regulation, for a power converter operating at high frequency and light load.

To solve the aforementioned problem, some approaches have been proposed to provide a variable LEB time. For example, in U.S. Pat. Nos. 6,144,245, 5,418,410 and 6,219,262, the gate current that the driver provides for the switching transistor is compared with a threshold, to decide the end point of a LEB time. However, due to the excessive prolongation, these approaches require some additional computations in order to decide the end point of the LEB time.

SUMMARY OF THE INVENTION

An object of the present invention is to provide LEB circuit and method for a switching mode power converter, which would adaptively determine the end point of a blanking period. Circuit and method are also provided to prevent a system from entering pulse skipping mode while maintain good power efficiency by adaptively lowering the switching frequency thereof.

According to the present invention, a LEB circuit senses an inductor current of a switching mode power converter and compares the inductor current with a threshold to determine an end point of a LEB time, whereby a PWM controller is blocked from receiving a feedback signal during the LEB time. Additionally, to avoid a LEB window occupying the minimum on-time of the power converter that will result in continuously increasing output voltage of the power converter and thereby bring the system entering its pulse skipping mode for maintaining desirable line regulation and power efficiency, it is provided a frequency adjusting circuit, such as a current trimming device, in an oscillator of the PWM controller to reduce a charging current in the oscillator when the output voltage of the power converter is excessively high so as to lower the oscillator frequency, to thereby ensure the power converter maintaining periodical charging and discharging, preventing serious ripples or undesired harmonics.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 2:
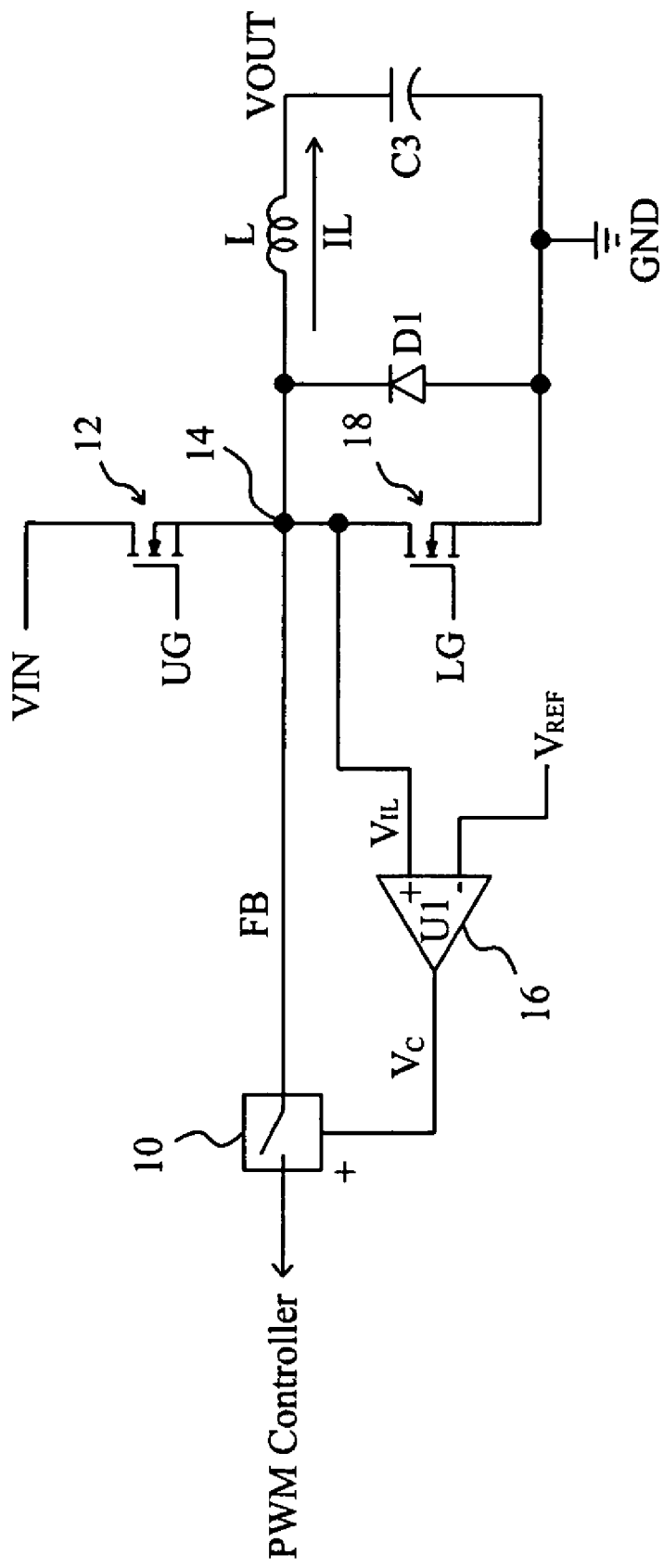
FIG. 2 is a circuit diagram of an embodiment according to the present invention.

FIG. 2 provides an embodiment according to the present invention, in which a power stage of a switching mode power converter includes transistors 12 and 18 functioning as a high-side power switch and a low-side power switch and switched by signals UG and LG respectively, to convert an input voltage. VIN to an output voltage VOUT, and a LEB circuit comprises a switch 10 and a comparator 16. The switch 10 is arranged on the path that the PWM controller of the switching mode power converter receives the feedback signal FB provided by the power stage, and the comparator 16 senses the current IL on the inductor L of the power stage and compares the inductor current IL with a threshold REF so as to generate a comparison signal Vc for controlling the switch 10. In this embodiment, the on-resistance of the low-side transistor 18 is used as a current sense resistor to monitor the inductor current IL by sensing the voltage VIL across the transistor 18. In another embodiments, various different circuits may be employed to sense the inductor current IL. The sensing of the inductor current Il is a prior art.

Figure 1:
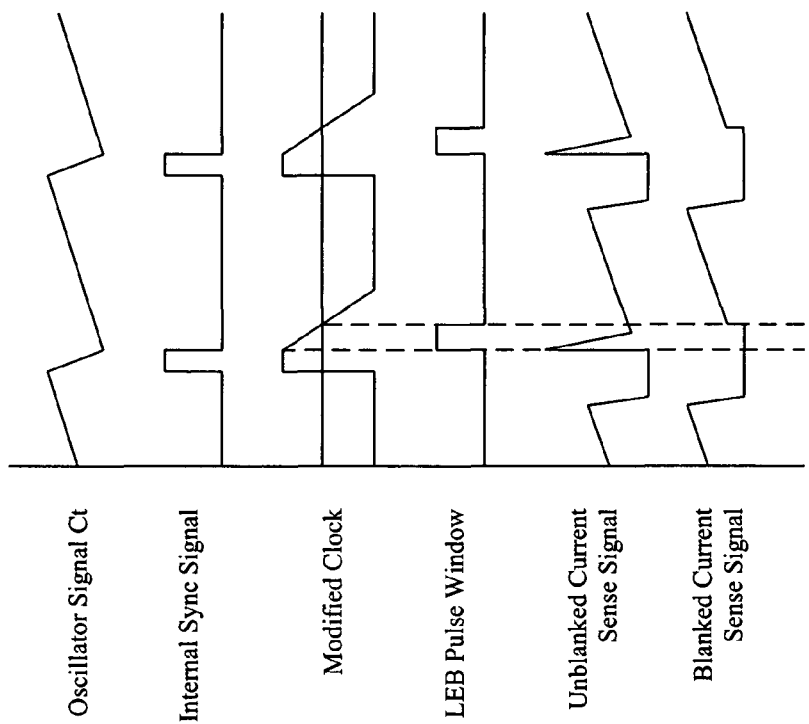
FIG. 1 is a timing diagram illustrating a traditional LEB technique for a switching mode power converter.
Figure 3:
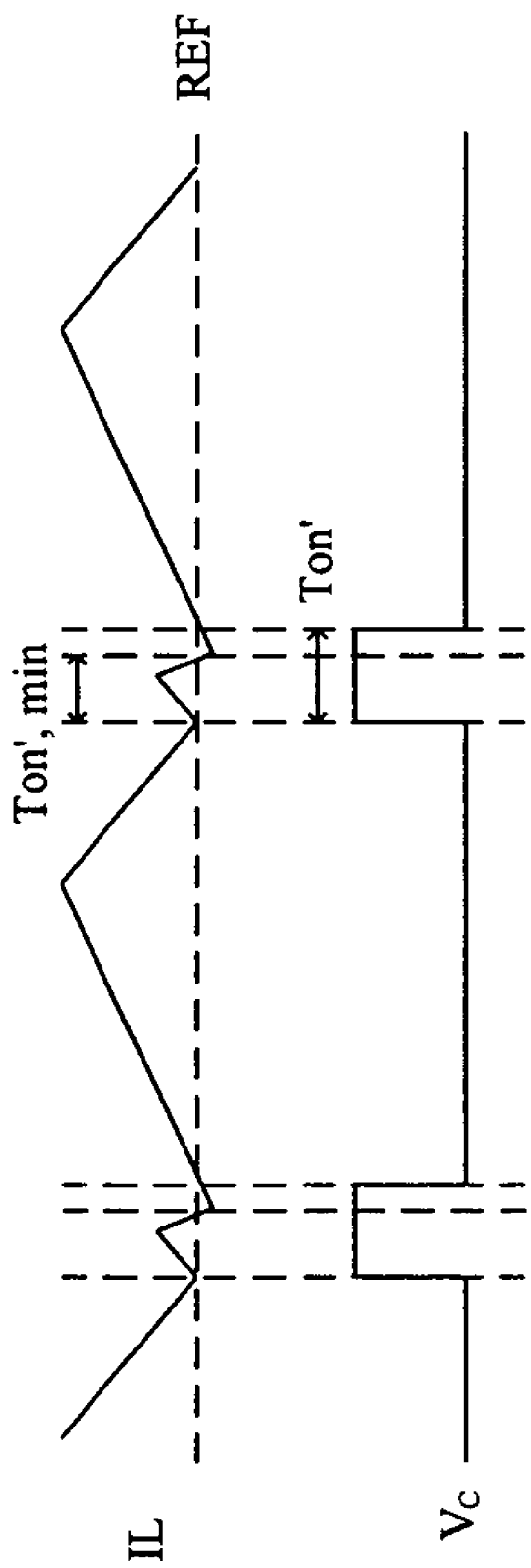
FIG. 3 is a timing diagram illustrating the comparison signal and the inductor current in the circuit of FIG. 2.

Referring to FIGS. 1 and 3, similar to the traditional LEB technique shown in FIG. 1, the start point of a LEB time according to the present invention is located at the valley of the oscillator signal Ct, and as shown in FIG. 3, at this moment the inductor current IL decreases to be equal to the threshold REF and the comparison signal Vc transits to high so that the switch 10 is turned off by the comparison signal Vc to disconnect the feedback path. After each time a LEB time is started, a predetermined minimum on-time Ton',min will follow thereto, which may be a predetermined constant ratio of a LEB pulse window Ton', for example 30% of Ton', or a predetermined constant time period, for example 30 ns. During this minimum on-time Ton',min, the switch 10 remains turned off no matter the inductor current IL is higher or lower than the threshold REF. After the minimum on-time Ton',min is up, if the inductor current IL is higher than the threshold REF, i.e. the end point of the LEB time, the comparison signal Vc is low and turns on the switch 10 to terminate the LEB time. A LEB pulse window Ton' is thus produced. As shown in FIG. 3, a LEB pulse window Ton' includes a minimum on-time Ton',min and is terminated by the end point of a LEB time that the LEB circuit according to the present invention detects. The threshold REF may be set nearby the valley of the inductor current IL. This control method requires no additional computations to accurately determine the end point of a LEB time, and will not be influenced by the effect resulted from temperature variation and process drift.

As shown in FIGS. 2 and 3, the current IL in the inductor L is sensed and compared with the predetermined threshold REF to decide the end point of the blanking pulse. Unlike the traditional method shown in FIG. 1, node voltages at the gate of the power switch and the output of a sense resistor are detected. This new technique has the advantage of reducing delay which exists in the traditional circuit since the gate voltage changes well ahead of the inductor current does, and this delay can drastically deteriorate the power efficiency and leads to shortening of the lifetime of the power devices. Traditional blanking time is predetermined and is a design parameter. In order to cover all possible corners under all circumstances, a very large margin has to be designed which takes a large portion of the minimum on time, and this will not be tolerable once the system is running at higher switching frequency or the output voltage is very low for large input voltage VIN. While the new technique allows designer more room for optimizing the minimum on-time, there is still a chance that the minimum duty cycle is occupied by the blanking window. The output voltage will continue to grow and the system will go into pulse skipping mode in order to keep good line regulation as well as power efficiency. However, pulse skipping can introduce large ripples and unwanted output harmonics.

Figure 4:
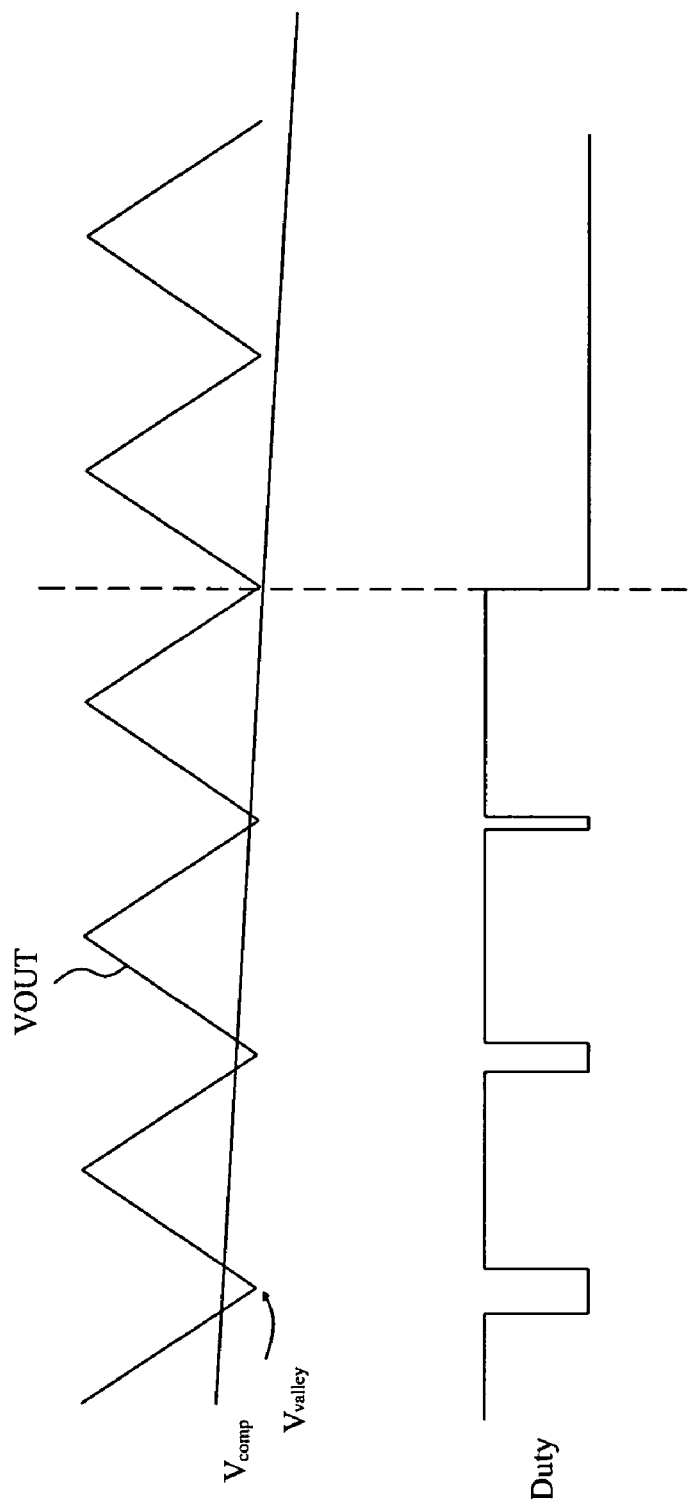
FIG. 4 is a diagram illustrating the time instant when a PWM controller is about to enter pulse skipping mode.

If the input voltage VIN is much higher than the output voltage VOUT and the load is quite light, the on-time of the high-side transistor 12 will be very short, and may be as short as the predetermined minimum on-time Ton',min. The shorter the on-time is, the greater the ratio of the LEB pulse window Ton' occupying in the on-time is. If the LEB pulse window Ton' takes up to a certain ratio of the on-time, the PWM controller will fail to sense the inductor current IL in time so that the output voltage VOUT will keep rising to have the system entering pulse skipping mode. In a general PWM controller, the feedback voltage derived from the output is compared with a reference value to generate an error voltage Vcomp by an error amplifier, and the error voltage Vcomp is then compared with a triangle wave. When the triangle wave is lower than the error voltage Vcomp, the high-side transistor is on. Referring to FIG. 4, with the increasing output voltage VOUT, the error voltage Vcomp is decreasing gradually and the time that the valley voltage Vvalley of the triangle wave is lower than the error voltage Vcomp is getting shorter and shorter, resulting in that the on-time of the high-side transistor 12 is getting shorter and shorter. Generally speaking, to have both of stable output voltage VOUT and good power efficiency, the system will enter pulse skipping mode after the error voltage Vcomp decreases under the valley voltage Vvalley, in which one or more switching circles of turning on the high-side transistor 12 are skipped to suspend charging the output capacitor of the power converter. When the output voltage VOUT decreases to make the error voltage Vcomp raise to high enough, the system will proceed with operation under the PWM mode. However, such aperiodic charging and discharging aggravates the variation of the inductor current IL and in turn enlarges the ripples that disturb the voltage stability, even causes multi-phase harmonics that turn the power converter itself into an interference source, resulting in decadent system efficiency.

Figure 5:
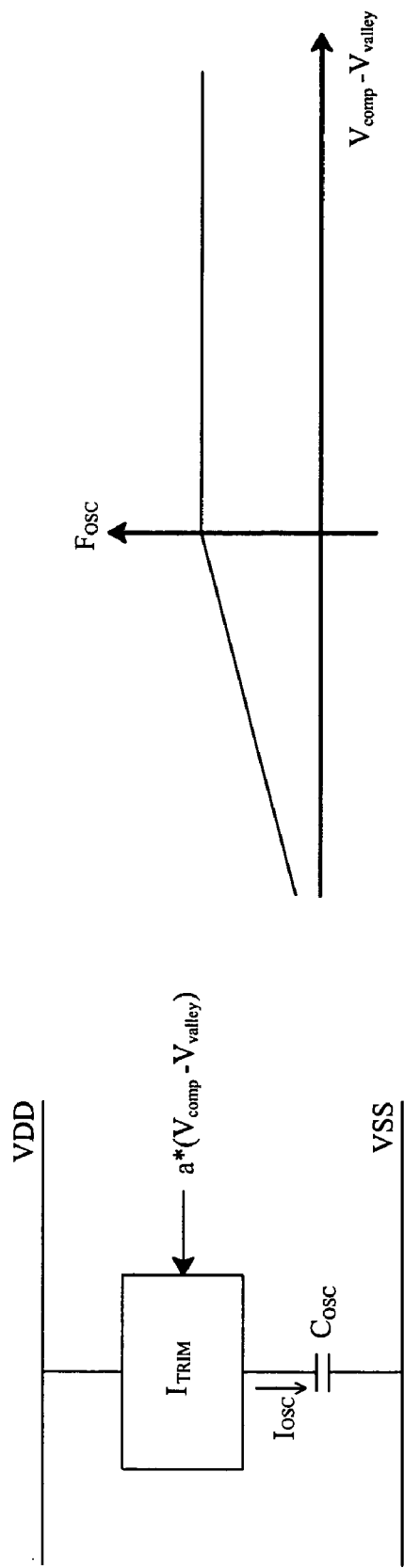
FIG. 5 is a diagram illustrating a current trimming circuit and the frequency lowering of a PWM controller.

To avoid a PWM controller entering pulse skipping mode, circuit and method are provided for maintaining a power converter to periodically charge and discharge the output capacitor thereof. In a PWM controller, an oscillator charges a capacitor $C_{OSC}$ with a charging current and sends out a pulse when the capacitor $C_{OSC}$ is charged to a voltage level, so as to provide a constant oscillator frequency. The feature of the circuit and method according to the present invention is to provide a frequency adjusting circuit to lower the oscillator frequency when the output voltage VOUT is excessively high. The left part of FIG. 5 provides an embodiment for the frequency adjusting circuit, in which a current trimming mechanism $I_{TRIM}$ is provided in the oscillator for a PWM controller, and controls the magnitude of the charging current $I_{OSC}$ with a function of a×(Vcomp−Vvalley), where "a" is a constant. When the output voltage VOUT is excessively high such that Vcomp is smaller than Vvalley, i.e. a×(Vcomp−Vvalley)<0, the current trimming mechanism $I_{TRIM}$ will reduce the charging current $I_{OSC}$ and therefore the charging speed of the capacitor $C_{OSC}$ becomes slower, thereby retarding the generation of the pulses in the output of the oscillator, i.e. lowering the oscillator frequency $F_{OSC}$ and prolonging the interval between each time the high-side transistor 12 is turned on. As a result, the ratio of the LEB pulse window Ton' occupying in the on-time is reduced so that the system is prevented from entering pulse skipping mode, and the power converter maintains to periodically charging and discharging the output capacitor thereof. The right part of FIG. 5 shows the oscillator frequency $F_{OSC}$ vs. the difference (Vcomp−Vvalley), in which the oscillator frequency $F_{OSC}$ is maintained when Vcomp is higher than Vvalley, lowered and when Vcomp is lower than Vvalley. The greater the difference between Vcomp and Vvalley is, the more the oscillator frequency $F_{OSC}$ is reduced.

As shown in the above embodiments, the adaptively decided end point of the blanking time allows one to optimize the PWM controller design for better power efficiency at light load/low output voltage. It also allows the implementation of a circuit which avoids pulse skipping operation by lowering the switching frequency while maintaining good output ripple performance and reducing harmonics.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An adaptive LEB circuit for a switching mode power converter including a high-side power switch connected to an inductor through a phase node and switched with a variable on-time, and a feedback path for feeding back a current sense signal to a PWM controller, the adaptive LEB circuit comprising:
   a switch arranged on the feedback path; and
   a comparator for comparing an inductor current flowing through the inductor with a threshold to determine a comparison signal for switching the switch to disconnect and establish the feedback path to thereby produce a LEB pulse window.

2. The adaptive LEB circuit of claim 1, wherein the LEB pulse window comprises a minimum on-time.

3. The adaptive LEB circuit of claim 2, wherein the minimum on-time has a predetermined constant value.

4. The adaptive LEB circuit of claim 2, wherein the minimum on-time and the LEB pulse window have a proportionality therebetween.

5. The adaptive LEB circuit of claim 4, wherein the minimum on-time occupies thirty percent of the LEB pulse window.

6. The adaptive LEB circuit of claim 1, further comprising a frequency adjusting circuit for adjusting an oscillator frequency of an oscillator in the PWM controller.

7. The adaptive LEB circuit of claim 6, wherein the frequency adjusting circuit operates such that the LEB pulse window in the variable on-time occupies a ratio less than a predetermined value.

8. The adaptive LEB circuit of claim 7, wherein the frequency adjusting circuit lowers the oscillator frequency when an error voltage in the PWM controller is lower than a valley voltage.

9. The adaptive LEB circuit of claim 8, wherein the oscillator frequency is lowered progressively.

10. The adaptive LEB circuit of claim 8, wherein the frequency adjusting circuit comprises a current trimming circuit in the oscillator, for reducing a charging current in the oscillator when the error voltage is lower than the valley voltage.

11. An adaptive LEB method for a switching mode power converter including a high-side power switch connected to an inductor through a phase node and switched with a variable on-time, and a feedback path for feeding back a current sense signal to a PWM controller, the adaptive LEB method comprising the steps of:
   sensing an inductor current flowing through the inductor; and
   comparing the inductor current with a threshold for determining to disconnect and establish the feedback path to thereby produce a LEB pulse window.

12. The adaptive LEB method of claim 11, further comprising the step of switching a switch on the feedback path so as to disconnect and establish the feedback path.

13. The adaptive LEB method of claim 11, wherein the LEB pulse window comprises a minimum on-time.

14. The adaptive LEB method of claim 13, wherein the minimum on-time has a predetermined constant value.

15. The adaptive LEB method of claim 13, wherein the minimum on-time and the LEB pulse window have a proportionality therebetween.

16. The adaptive LEB method of claim 15, wherein the minimum on-time occupies thirty percent of the LEB pulse window.

17. The adaptive LEB method of claim 11, further comprising the step of adjusting an oscillator frequency of an oscillator in the PWM controller.

18. The adaptive LEB method of claim 17, wherein the LEB pulse window in the variable on-time occupies a ratio less than a predetermined value.

19. The adaptive LEB method of claim 18, wherein the step of adjusting an oscillator frequency of an oscillator in the PWM controller comprises the step of lowering the oscillator frequency when an error voltage in the PWM controller is lower than a valley voltage.

20. The adaptive LEB method of claim 19, wherein the oscillator frequency is lowered progressively.

21. The adaptive LEB method of claim 19, wherein the step of adjusting an oscillator frequency of an oscillator in the PWM controller comprises the step of reducing a charging current in the oscillator when the error voltage is lower than the valley voltage.

22. The adaptive LEB circuit of claim 1, wherein the comparator comprises a first input connected to the phase node, a second input receiving the threshold, and an output generating a switch signal for switching the switch.

23. The adaptive LEB method of claim 11, wherein the step of sensing an inductor current flowing through the inductor comprises the step of sensing a rising signal from the phase node.

24. The adaptive LEB method of claim 23, wherein the step of sensing a rising signal from the phase node comprises the step of sensing a voltage at the phase node.

* * * * *